United States Patent
Wu

(10) Patent No.: US 7,626,760 B2
(45) Date of Patent: Dec. 1, 2009

(54) TOP ANGLE FOCUS SCOPE

(76) Inventor: John Wu, 3135 Kashiwa St., Torrance, CA (US) 90505

(\*) Notice: Subject to any disclaimer, the term of this patent is extended or adjusted under 35 U.S.C. 154(b) by 278 days.

(21) Appl. No.: 11/978,368

(22) Filed: Oct. 27, 2007

(65) Prior Publication Data

US 2009/0109528 A1  Apr. 30, 2009

(51) Int. Cl.
*G02B 23/00* (2006.01)
(52) U.S. Cl. ......................... 359/426; 42/119
(58) Field of Classification Search .......... 359/425–427
See application file for complete search history.

(56) References Cited

U.S. PATENT DOCUMENTS

| 2,130,095 | A | * | 9/1938 | Langsner | 359/513 |
| 3,118,359 | A | * | 1/1964 | Leitz et al. | 359/700 |
| 2,960,912 | A | * | 11/1960 | Baker | 359/425 |
| 3,506,330 | A | * | 4/1970 | Ralph | 356/397 |
| 4,643,542 | A | * | 2/1987 | Gibson | 359/424 |
| 4,789,231 | A | * | 12/1988 | Shimizu | 359/422 |
| 5,434,704 | A | * | 7/1995 | Connors et al. | 359/403 |
| 5,499,456 | A | * | 3/1996 | Tomita | 42/122 |
| 6,005,711 | A | * | 12/1999 | Mai et al. | 359/424 |
| 6,351,907 | B1 | * | 3/2002 | Otteman | 42/120 |
| 6,598,332 | B1 | * | 7/2003 | Jibiki | 42/119 |
| 6,721,095 | B2 | * | 4/2004 | Huber | 359/427 |
| 6,816,305 | B2 | * | 11/2004 | Regan et al. | 359/429 |

\* cited by examiner

*Primary Examiner*—Stephone B Allen
*Assistant Examiner*—Mark Consilvio
(74) *Attorney, Agent, or Firm*—Clement Cheng

(57) ABSTRACT

A rifle scope has a front end receiving light and a rear end passing light to the user eye. The rifle scope has an elevation adjustment; an inside body is hollow and tubular and fitting inside a middle body which is also hollow and tubular shaped and a top angle focus adjustment mounted on the inside body in front of the elevation windage. The top angle focus adjustment has a top angle focus knob, a focus shaft mounted to the focus knob, and a top angle gear mounted to the focus shaft. The top angle focus knob and the focus shaft and the top angle gear are fixed so that they rotate together on an axis of the focus shaft. The inside body focus gear housing has an inside body focus gear meshing with the top angle gear, and the top angle gear rotation rotates the inside body focus gear.

15 Claims, 3 Drawing Sheets

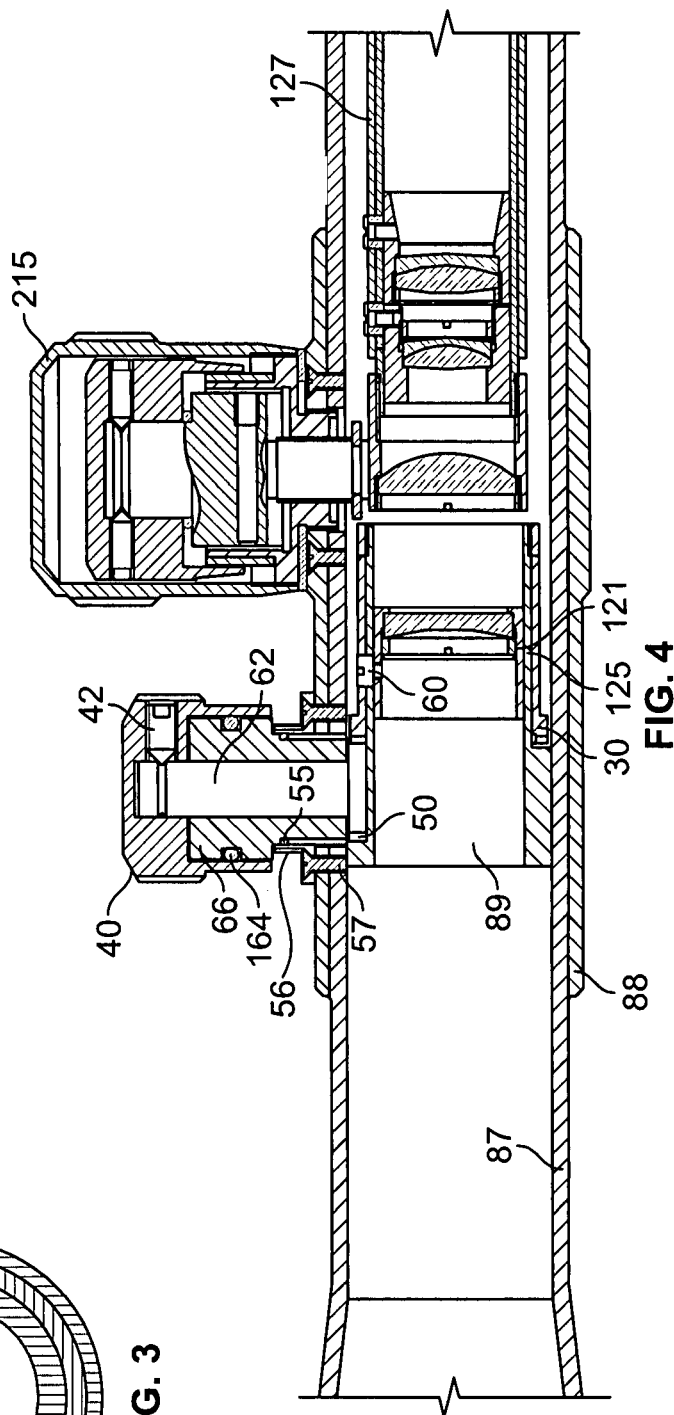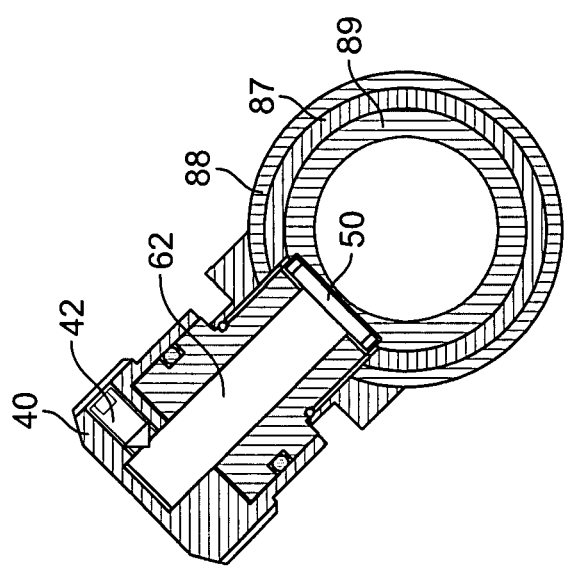

TOP ANGLE FOCUS SCOPE

DISCUSSION OF RELATED ART

A wide variety of advances in the field of firearms have helped game hunters as well as military personnel in the armed forces deal more effectively with adjustment of scopes on firearms. Although many firearms are fired using iron sights, scopes are becoming more and more prevalent as accuracy is becoming more and more important. A game hunter needs to have accuracy to kill game without causing cruel animal suffering. Military personnel dealing with terrorists also increasingly need accuracy to avoid killing civilians. Therefore, easy to use scopes on firearms are becoming more and more important due to the desire of firearm users for easy to use increased accuracy.

Typically, rifle scopes have a variety of knobs and adjustments. An elevation knob typically compensates for bullet drop, and a windage knob typically compensates for the crosswind. These knobs can also be used for calibration and adjustment of the scope before firing. Also, magnification and focus are a part of the adjustments on rifle scopes.

Typically, rifle scopes are designed for fitting on rifles, however many scopes are interchangeable such that a pistol scope can be put on a rifle scope and a rifle scope can be put on a pistol scope. Scopes for rifles or pistols are typically not adapted for use as telescopes, and telescopes are typically not adapted for use as rifle scopes or pistols scopes. In particular, telescopes do not have windage or elevation adjustment because telescopes do not need to account for bullet drop since they are not typically mounted on firearms.

In the prior art, the focus adjustment has typically been located in a clumsy location, and has not been well mechanically integrated into the scope. This invention seeks to improve on the prior art focus adjustment.

SUMMARY OF THE INVENTION

The present embodiment has a telescopic construction with an outer body covering a middle body, which in turn covers an inside body. The construction of the body portions is typically mostly cylindrical where the outer body and middle body as well as the inside body all have a circular cross-section. The body portions mentioned above are also typically made of metal with some minor plastic parts. The cylindrical configuration of the body portions defines a central axis that parallels the passage of light through the rifle scope. The image of the target is received and passes through a series of lenses housed within the body portions. Manipulation of the position of the body portions relative to each other provides an output image to an eye piece where a user places an eye for viewing target images. The elevation knob and windage knob are typically perpendicular to the main central axis.

A rear body moves in telescopic translation along the central axis. A magnification adjustment is mounted on the rear portion of the rear body. Magnification adjustment can magnify an image times, times, times, times or the like. The outer body is typically mounted to the rifle. The middle body has the front portion of the rifle scope which receives the target image, and also has some optics and lenses housed within.

Preferably, the top angle focus knob cap is also mounted perpendicular to the central axis. The inside body is mounted so that it can rotate clockwise or counterclockwise. The inside body has a focus pin mounted on a focus slot. The focus slot is shaped so that it receives the focus pin. The focus pin moves forward and backward depending upon the rotation of the focus shaft. The focus shaft is connected to top angle gear. The top angle gear has a gear surface mounted at an end of the focus shaft. The top angle gear surface is preferably circular and circumscribing the focus shaft. The inside body has gearing that cooperates with top angle gear so that turning the focus shaft operates the top angle gear which rotates the inside body. When the focus shaft is rotated clockwise from the perspective of a user looking at the top angle focus knob cap and rotating the top angle focus knob in a clockwise direction, the inside body will rotate in a counterclockwise direction when seen from the perspective of a user having an eye at the eyepiece in shooting position.

Preferably, the top angle gear has a lower number of teeth than the number of teeth of the inside body focus gear mounted on the inside body. The circumference of the inside body is preferably greater than the circumference of top angle gear. Top angle gear is preferably formed as a separate part, and then mounted to an interior end of the focus shaft.

The top angle focus knob comprises a top angle focus knob cap having focus grip that has appropriate surface texture such as vertical grip protrusions that allow a user to grasp the top angle focus knob having focus grip. The top angle focus knob having focus grip is at the external end of focus shaft. Knob indicia may be printed on the focus group. A set screw passes through a sidewall formed on the focus grip so that the top angle focus knob having focus grip is secured to a focus knob body. The focus knob body is preferably made of metal, and the focus grip is preferably made of a plastic. A focus knob retainer fits with the focus knob body so that the knob body does not fall off the focus shaft. Optionally, a retaining ring can seal top angle focus knob cap.

Alternatively, the focus knob body which has a hollow aperture for receiving focus shaft can also have a threaded connection between focus shaft and knob body. As a third alternative, the focus knob body and the focus shaft may have an adhesive or interference fit bonding. In any case, once the parts are all assembled for the top angle focus knob, the focus grip on the top angle focus knob, with knob indicia locked to the focus knob body via set screw, mounted via focus knob retainer to the focus shaft having top angle gear all do not move relative to each other and act as a single piece.

The focus slot guides and biases the focus pin forward and back with the rotation of the inside body relative to the outside body. The focus slot has a sloped profile that can be varied according to the sensitivity desired on the top angle focus knob cap. Sensitivity can also be varied by changing the number of teeth on the top angle gear, or by changing the circumference of the top angle gear so that it has a different gear ratio with inside body. In any case, the focus pin preferably does not protrude substantially from the focus slot. The edges of the focus slot push the focus pin.

The focus pin is connected to a lens retainer body. The lens retainer body holds a focus lens and an O-ring. The inside body receives a shaft retainer body that has a focus shaft recess which is formed as a circular recess on an external front portion of shaft retainer body. The focus shaft recess retains the bottom portion of the focus shaft, so that the focus shaft does not wobble when a user is turning the knob.

A focus pin sliding slot is mounted on the shaft retainer body in front to back orientation, parallel to the central axis. The focus pin sliding slot on the shaft retainer body has the same width as the focus slot formed on the inside body, however the two slots should be of different path, length orientation and shape. The lens retainer body goes inside the shaft retainer body, which in turn goes inside the inside body focus gear housing.

The focus lens moves forward and backward when the top angle focus knob cap is rotated. This focuses the rifle scope.

An aperture for the focus shaft is formed on a middle body and an outer aperture which is the focus knob aperture is formed on outer body. The focus knob fits through the aperture. The focus knob flange covers the bottom portion of the focus knob body. A pair of focus knob flange bolts or screws threads through flange screw holes on the outer body and thread through middle body flange bolt holes.

Similarly, a locking pin locks from an outer body through a middle body locking pin hole to secure other various components such as rear body. A number of slots formed on the rear body allow magnification adjustment to slide forward and backward for moving internal optical components such as lenses to change the magnification. The magnification adjustment and other adjustments can be mounted behind the main portion of the scope at a rear end.

In a first embodiment of the present invention, the focus knob is mounted on the left top portion of the scope so that a user may adjust the focus knob with the left hand, then take the left-hand back to the rifle for aiming the rifle. In the first embodiment of the present invention, the focus knob is at approximately 45° from the top dead center. Preferably, the knob indicia are mounted so that they face the user during preparation for a shooting position. In the first embodiment of the present invention, the focus knob is in front of the elevation and windage knob. The first embodiment of the present invention can also be flipped or taken a mirror image of so that the focus knob is a about 45° from the top dead center but on the right side.

In the second embodiment of the present invention, the focus knob is mounted on the right and is on the right side parallel to the windage knob. In the second embodiment, the focus knob is in front of the windage and elevation knob. Again, just as in the first embodiment of the present invention, the second embodiment of the present invention can also have the focus knob flipped so that it is on the left side rather than the right side. Therefore, there are a total of four different configurations, left side configuration, left top configuration, right top configuration, and right configuration.

BRIEF DESCRIPTION OF THE DRAWINGS

FIG. 3 is a first embodiment front sectional view showing the focus knob at a 45° angle to the left of the scope.

FIG. 4 is a second embodiment top sectional view showing the focus knob on the right of the scope.

Figure 1:
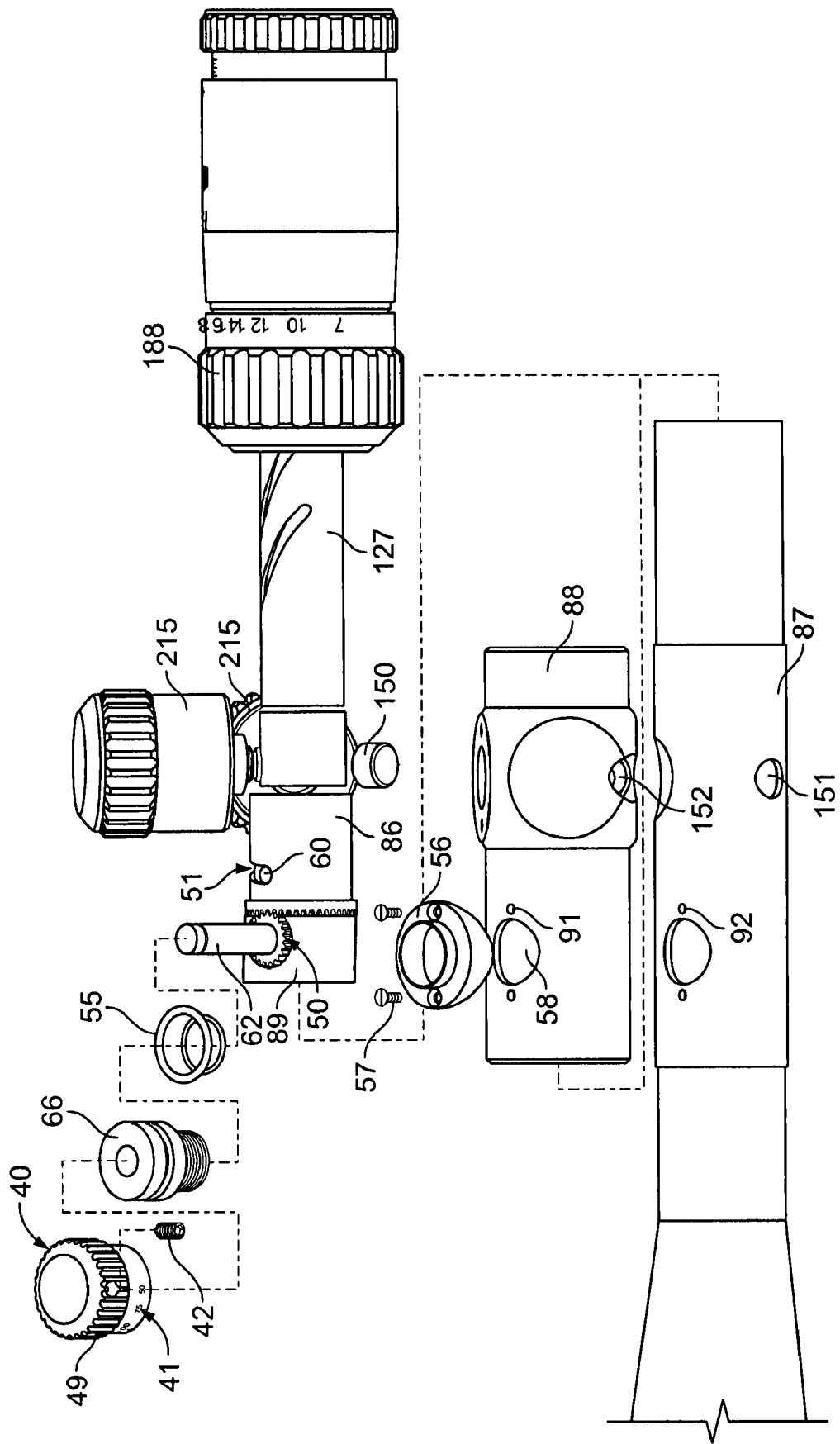
FIG. 1 is an exploded view of the device showing assembly of the outer components.

For ease of reference, a call out list of elements is provided below.
30 Inside Body Focus Gear Housing
40 Top Angle Focus Knob Cap
41 Knob Indicia
42 Set Screw
49 Focus Grip
50 Top Angle Gear
51 Focus Slot
55 Focus Knob Retainer
56 Focus Knob Flange
57 Focus Knob Flange Bolts
58 Focus Knob Aperture
60 Focus Pin
62 Focus Shaft
66 Focus Knob Body
86 Inside Body
87 Middle Body
88 Outer Body
89 Shaft Retainer
91 Flange Bolt Holes
92 Flange Bolt Holes On Middle Body
121 Focus Lens
122 O-Ring
125 Lens Retainer Body
127 Rear Body, Also Called Scope Erector Unit
150 Locking Pin
151 Middle Body Locking Hole
152 Outer Body Locking Pin Hole
160 Focus Pin Sliding Slot
162 Focus Shaft Recess
188 Magnification Knob
215 Elevation Windage Knob
230 Inside Body Focus Gear

DETAILED DESCRIPTION OF THE PREFERRED EMBODIMENT

The present embodiment has a telescopic construction with an outer body 88 covering a middle body 87, which in turn covers an inside body 86. The construction of the body portions is typically mostly cylindrical where the outer body 80 and middle body 87 as well as the inside body 86 all have a circular cross-section. The body portions mentioned above are also typically made of metal with some minor plastic parts. The cylindrical configuration of the body portions define a central axis that parallels the passage of light through the rifle scope. The image of the target is received and passes through a series of lenses housed within the body portions. Manipulation of the position of the body portions relative to each other provides an output image to an eye piece where a user places an eye for viewing target images. The elevation knob and windage knob 215 are typically perpendicular to the main central axis.

A rear body 127 moves in telescopic translation along the central axis. A magnification adjustment is mounted on the rear portion of the rear body 127. Magnification adjustment can magnify an image 7 times, 10 times, 12 times, 14 times or the like. The outer body 88 is typically mounted to the rifle. The middle body has the front portion of the rifle scope which receives the target image, and also has some optics and lenses housed within.

Preferably, the top angle focus knob cap 40 is also mounted perpendicular to the central axis. The inside body is mounted so that it can rotate clockwise or counterclockwise. The inside body has a focus pin 60 mounted on a focus slot 51. The focus slot is shaped so that it receives the focus pin 60. The focus pin 60 moves forward and backward depending upon the rotation of the focus shaft 62. The focus shaft 62 is connected to top angle gear 50. The top angle gear 50 has a gear surface mounted at an end of the focus shaft 62. The top angle gear 50 gear surface is preferably circular and circumscribing the focus shaft 62. The inside body 86 has gearing that cooperates with top angle gear 50 so that turning the focus shaft 62 operates the top angle gear 50 which rotates the inside body 86.

When the focus shaft 62 is rotated clockwise from the perspective of a user looking at the top angle focus knob cap 40 and rotating the top angle focus knob 40 in a clockwise direction, the inside body 86 will rotate in a counterclockwise direction when seen from the perspective of a user having an eye at the eyepiece in shooting position. The gearing can also be reversed so that the inside body focus gear engages on an opposite side of the top angle gear 50 to allow reversing of the orientation. In reversed orientation, clockwise rotation of the focus shaft 62 would cause clockwise rotation of the top angle focus knob, which would also cause clockwise rotation of the inside body 86.

Preferably, the top angle gear 50 has a lower number of teeth than the number of teeth of the inside body focus gear 230 mounted on the inside body 86. The circumference of the inside body 86 is preferably greater than the circumference of top angle gear 50. Top angle gear 50 is preferably formed as a separate part, and then mounted to an interior end of the focus shaft 62.

The top angle focus knob comprises a top angle focus knob cap 40 having focus grip 49 that has appropriate surface texture such as vertical grip protrusions that allow a user to grasp the top angle focus knob 40 having focus grip 49. The top angle focus knob 40 having focus grip 49 is at the external end of focus shaft 62. Knob indicia 41 may be printed on the focus group 49. A set screw 42 passes through a sidewall formed on the focus grip 49 so that the top angle focus knob 40 having focus grip 49 is secured to a focus knob body 66. The focus knob body 66 is preferably made of metal, and the focus grip 49 is preferably made of a plastic. A focus knob retainer 55 fits with the focus knob body 66 so that the knob body 66 does not fall off the focus shaft 62. Optionally, a retaining ring 164 can seal top angle focus knob cap.

Alternatively, the focus knob body 66 which has a hollow aperture for receiving focus shaft 62 can also have a threaded connection between focus shaft 62 and knob body 66. As a third alternative, the focus knob body 66 and the focus shaft 62 may have an adhesive or interference fit bonding. In any case, once the parts are all assembled for the top angle focus knob, the focus grip 49 on the top angle focus knob 40, with knob indicia 41 locked to the focus knob body 66 via set screw 42, mounted via focus knob retainer 55 to the focus shaft 62 having top angle gear 50 all do not move relative to each other and act as a single piece.

The focus slot 51 guides and biases the focus pin 60 forward and back with the rotation of the inside body 86 relative to the outside body 88. The focus slot 51 has a sloped profile that can be varied according to the sensitivity desired on the top angle focus knob cap 40. Sensitivity can also be varied by changing the number of teeth on the top angle gear 50, or by changing the circumference of the top angle gear 50 so that it has a different gear ratio with inside body 86. A positive or negative gear ratio can be established. A positive gear ratio is defined as the case when turning the top angle gear 50, the top angle gear 50 turns faster than the inside body 86. A positive gear ratio is shown in the first figure. In any case, the focus pin 60 preferably does not protrude substantially from the focus slot 51. The edges of the focus slot 51 push the focus pin 60.

Figure 2:
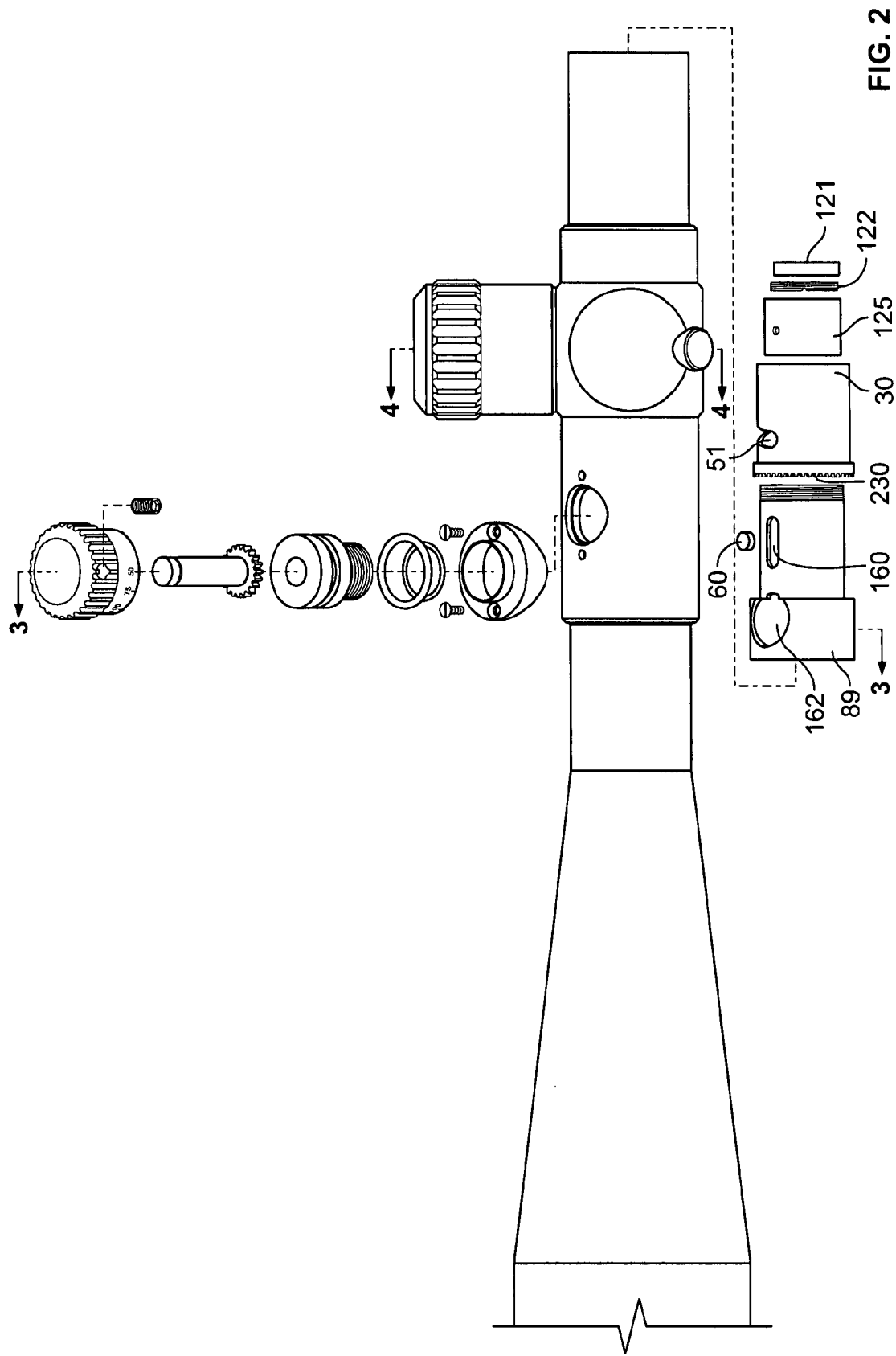
FIG. 2 is an exploded view of the device showing interior components.

As seen in FIG. 2, focus pin 60 is connected to a lens retainer body 125. The lens retainer body 125 holds a focus lens 121 and an O-ring 122. The inside body 86 receives a shaft retainer body that has a focus shaft recess 162 which is formed as a circular recess on an external front portion of shaft retainer body 89. The focus shaft recess 162 retains the bottom portion of the focus shaft, so that the focus shaft does not wobble when a user is turning the knob.

A focus pin sliding slot 160 is mounted on the shaft retainer body 89 in front to back orientation, parallel to the central axis. The focus pin sliding slot 160 on the shaft retainer body 89 has the same width as the focus slot 51 formed on the inside body 86, however the two slots should be of different path, length orientation and shape. The lens retainer body 125 goes inside the shaft retainer body 89, which in turn goes inside the inside body focus gear housing 30.

The focus lens 121 moves forward and backward when the top angle focus knob cap 40 is rotated. This focuses the rifle scope. An aperture for the focus shaft 62 is formed on a middle body 87 and an outer aperture which is the focus knob aperture 58 is formed on outer body 88. The focus knob fits through the aperture. The focus knob flange 56 covers the bottom portion of the focus knob body 66. A pair of focus knob flange bolts or screws 57 thread through flange screw holes 91 on the outer body 88 and thread through middle body flange bolt holes 92. Similarly, a locking pin 150 locks from an outer body 88 through a middle body locking pin hole 151 to secure other various components such as rear body 127. Also, as can be seen from the first figure, a number of slots formed on the rear body 127 allow magnification adjustment 188 to slide forward and backward for moving internal optical components such as lenses to change the magnification. The magnification adjustment 188 and other adjustments can be mounted behind the main portion of the scope at a rear end.

In a first embodiment of the present invention, the focus knob is mounted on the left top portion of the scope so that a user may adjust the focus knob with the left hand, then take the left-hand back to the rifle for aiming the rifle. In the first embodiment of the present invention, the focus knob is at approximately 45° from the top dead center. Preferably, the knob indicia 41 are mounted so that they face the user during preparation for a shooting position. In the first embodiment of the present invention, the focus knob is in front of the elevation and windage knob 215. The first embodiment of the present invention as shown in FIG. 3 can also be flipped or taken a mirror image of so that the focus knob is that approximately 45° from the top dead center but on the right side.

In the second embodiment of the present invention, the focus knob is mounted on the right and is on the right side parallel to the windage knob. In the second embodiment, the focus knob is in front of the windage and elevation knob 215. Again, just as in the first embodiment of the present invention, the second embodiment of the present invention can also have the focus knob flipped so that it is on the left side rather than the right side. Therefore, there are a total of four different configurations, left side 90° configuration, left top 45° configuration, right top 45° configuration, and right 90° configuration.

The foregoing describes the preferred embodiments of the invention. Modifications may be made without departing from the spirit and scope of the invention as set forth in the following claims. The present invention is not limited to the embodiments described above, but encompasses any and all embodiments within the scope of the following claims.

The invention claimed is:

1. A rifle scope having a front end receiving light and a rear end passing light to the user eye comprising:
 a. a elevation adjustment;
 b. an inside body is hollow and tubular and fitting inside a middle body which is also hollow and tubular shaped;
 c. a top angle focus adjustment mounted on the inside body in front of the elevation windage, wherein top angle focus adjustment further comprises:
  i. a top angle focus knob;
  ii. a focus shaft mounted to the focus knob;
  iii. a top angle gear mounted to the focus shaft, wherein the top angle focus knob and the focus shaft and the top angle gear are fixed so that they rotate together on an axis of the focus shaft;
  iv. an inside body focus gear housing having an inside body focus gear meshing with the top angle gear, wherein the top angle gear rotation rotates the inside body focus gear, wherein the inside body focus gear housing further comprises a focus slot;

v. a focus lens held within a lens retainer body that is held within the inside body focus gear housing;

vi. a shaft retainer body fixed to the middle body, wherein the shaft retainer body further comprises a focus pin sliding slot retaining a focus pin, wherein the inside body focus gear housing is in sliding telescopic configuration relative to the shaft retainer body so that the turn of the top angle focus knob rotates the focus shaft, which rotates the top angle gear, which rotates the inside body focus gear housing, which has a focus slot that cooperates with the focus pin held within the focus pin slot so that the inside body focus gear housing moves in sliding telescopic configuration relative to the shaft retainer body.

2. The rifle scope of claim 1, wherein the top angle focus knob is mounted between a top dead center of the rifle scope and 90° from the top dead center on a side of the rifle scope.

3. The rifle scope of claim 2, wherein the top angle focus knob is mounted on the right side, and is in front of the elevation adjustment.

4. The rifle scope of claim 2, wherein the top angle gear has a positive gear ratio with the inside body focus gear.

5. The rifle scope of claim 2, wherein the top angle focus knob is mounted at a 90 degree angle to a top dead center of the rifle scope, wherein the top angle focus knob is mounted on the left side, and is in front of the elevation adjustment.

6. A scope having a front end receiving light and a rear end passing light to the user eye comprising:

a. a elevation adjustment;

b. an inside body is hollow and tubular and fitting inside a middle body which is also hollow and tubular shaped;

c. a top angle focus adjustment mounted on the inside body in front of the elevation windage, wherein top angle focus adjustment further comprises:

i. a top angle focus knob having a focus shaft;

ii. a top angle gear mounted to the focus shaft, wherein the top angle focus knob and the focus shaft and the top angle gear are fixed so that they rotate together on an axis of the focus shaft;

iii. an inside body focus gear housing having an inside body focus gear meshing with the top angle gear, wherein the top angle gear rotation rotates the inside body focus gear, wherein the inside body focus gear housing further comprises a focus slot;

iv. a focus lens held within a lens retainer body that is held within the inside body focus gear housing;

v. a shaft retainer body fixed to the middle body, wherein the shaft retainer body further comprises a focus pin sliding slot retaining a focus pin, wherein the inside body focus gear housing is in sliding telescopic configuration relative to the shaft retainer body so that the turn of the top angle focus knob rotates the focus shaft, which rotates the top angle gear, which rotates the inside body focus gear housing, which has a focus slot that cooperates with the focus pin held within the focus pin slot so that the inside body focus gear housing moves in sliding telescopic configuration relative to the shaft retainer body, wherein the focus slot is inclined, wherein the focus pin sliding slot holds the focus pin in a forward and backward sliding configuration.

7. The scope of claim 6, wherein the top angle focus knob is mounted at a mounting angle between a top dead center of the rifle scope and 90° from the top dead center on a side of the scope.

8. The scope of claim 7, wherein the top angle focus knob is mounted on the right side, and is in front of the elevation adjustment.

9. The scope of claim 7, wherein the top angle gear has a positive gear ratio with the inside body focus gear.

10. The scope of claim 7, wherein the top angle focus knob is mounted at a 90 degree angle to a top dead center of the scope, wherein the top angle focus knob is mounted on the left side, and is in front of the elevation adjustment.

11. A scope having a front end receiving light and a rear end passing light to the user eye comprising:

a. a elevation adjustment;

b. an inside body is hollow and tubular and fitting inside a middle body which is also hollow and tubular shaped;

c. a top angle focus adjustment mounted on the inside body in front of the elevation windage, wherein top angle focus adjustment further comprises:

i. a top angle focus knob having a focus shaft;

ii. a top angle gear mounted to the focus shaft, wherein the top angle focus knob and the focus shaft and the top angle gear are fixed so that they rotate together on an axis of the focus shaft;

iii. an inside body focus gear housing having an inside body focus gear meshing with the top angle gear, wherein the top angle gear rotation rotates the inside body focus gear, wherein the inside body focus gear housing further comprises a focus slot;

iv. a focus lens held within the inside body focus gear housing;

v. a shaft retainer body fixed to the middle body, wherein the shaft retainer body further comprises a focus pin sliding slot retaining a focus pin, wherein the inside body focus gear housing is in sliding telescopic configuration relative to the shaft retainer body so that the turn of the top angle focus knob rotates the focus shaft, which rotates the top angle gear, which rotates the inside body focus gear housing, which has a focus slot that cooperates with the focus pin held within the focus pin slot so that the inside body focus gear housing moves in sliding telescopic configuration relative to the shaft retainer body, wherein when the focus shaft is rotated in a clockwise rotation, the inside body is rotated in a counterclockwise rotation.

12. The scope of claim 11, wherein the top angle focus knob is mounted at a mounting angle between a top dead center of the rifle scope and 90° from the top dead center on a side of the scope, and is mounted in front of the elevation adjustment, wherein the focus slot is inclined, wherein the focus pin sliding slot holds the focus pin in a forward and backward sliding configuration.

13. The scope of claim 12, wherein the top angle focus knob is mounted on the right side.

14. The scope of claim 12, wherein the top angle gear has a positive gear ratio with the inside body focus gear.

15. The scope of claim 12, wherein the top angle focus knob is mounted at a 90 degree angle to a top dead center of the scope, wherein the top angle focus knob is mounted on the left side, and is in front of the elevation adjustment.

* * * * *